(12) United States Patent
Kataoka

(10) Patent No.: US 6,525,141 B2
(45) Date of Patent: Feb. 25, 2003

(54) RUBBER COMPOSITION FOR GOLF BALL AND GOLF BALL PRODUCED USING THE SAME

(75) Inventor: Nobuyuki Kataoka, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 4 days.

(21) Appl. No.: 09/822,519

(22) Filed: Apr. 2, 2001

(65) Prior Publication Data

US 2001/0053808 A1 Dec. 20, 2001

(30) Foreign Application Priority Data

Mar. 20, 2000 (JP) .................................. 2000-097297
Mar. 31, 2000 (JP) .................................. 2000-097158
Sep. 1, 2000 (JP) .................................. 2000-265563

(51) Int. Cl.$^7$ .............................. A63B 37/06; C08L 9/00
(52) U.S. Cl. .................. 525/261; 525/274; 524/392; 473/372; 473/373; 473/377
(58) Field of Search .................. 525/261, 274; 473/372, 373, 377; 524/392

(56) References Cited

U.S. PATENT DOCUMENTS 4,838,556 A * 6/1989 Sullivan
5,252,652 A 10/1993 Egashira et al. ............ 524/392
6,315,683 B1 * 11/2001 Yoshida

FOREIGN PATENT DOCUMENTS

| JP | 2-92378 | 4/1990 |
| JP | 2-297384 | 12/1990 |
| JP | 4-109970 | 4/1992 |
| JP | 10-323407 | 12/1998 |
| JP | 11-262544 | 9/1999 |

* cited by examiner

Primary Examiner—David J. Buttner
(74) Attorney, Agent, or Firm—Sughrue Mion, PLLC

(57) ABSTRACT

A rubber composition comprising (A) a base rubber, (B) a metal salt of an unsaturated carboxylic acid and/or a mixture of an unsaturated carboxylic acid and zinc oxide, (C) an organic peroxide, and (D) a non-aromatic mercaptan and/or (E) a dialkyl disulfide whose alkyl has 3–10 carbon atoms is suitable for forming center cores of solid golf balls and wound golf balls and one-piece golf balls by a pressure molding process.

12 Claims, No Drawings

RUBBER COMPOSITION FOR GOLF BALL AND GOLF BALL PRODUCED USING THE SAME

This invention relates to a rubber composition from which solid cores and solid centers (collectively referred to as center cores) of solid golf balls and wound golf balls, and one-piece golf balls are efficiently formed to a high level of resilience, and a golf ball produced using the same and endowed with high rebound. More particularly, it relates to a golf ball-forming rubber composition which is suitable for pressure molding and capable of forming molded parts having an adequate hardness and a satisfactory initial velocity capability, and a golf ball produced using the same and endowed with high rebound.

BACKGROUND OF THE INVENTION

From the past, a variety of rubber compositions were used as molding materials for center cores of solid golf balls and wound golf balls, and one-piece golf balls.

A number of proposals have been made on golf ball-forming rubber compositions. For example, JP-A 11-262544 discloses a rubber composition comprising a base rubber, a co-crosslinking agent, and other components, to which is added an organic sulfur compound having an aromatic group or an alkyl group of at least 12 carbon atoms, such as diphenyl disulfide or didodecyl sulfide.

The organic sulfur compound is blended for the purpose of slowing vulcanization down so that the rubber composition is given an appropriate vulcanization rate to enable injection molding. If this rubber composition is worked by the pressure molding process which is customarily used for the molding of rubber compositions into golf balls, productivity becomes low due to the extended vulcanization time.

SUMMARY OF THE INVENTION

An object of the invention is to provide a golf ball-forming rubber composition which lends itself to pressure molding to form center cores of solid golf balls and wound golf balls, and one-piece golf balls and is capable of forming molded parts having an adequate hardness and a satisfactory initial velocity capability without lowering productivity. Another object of the invention is to provide a golf ball produced using the rubber composition and endowed with an adequate hardness and high rebound.

It has been found that when a specific organic sulfur compound in the form of non-aromatic mercaptan or dialkyl disulfide is compounded in a golf ball-forming rubber composition comprising (A) a base rubber, (B) a metal salt of an unsaturated carboxylic acid and/or a mixture of an unsaturated carboxylic acid and zinc oxide, and (C) an organic peroxide, the composition is modified to be best suited for pressure molding without lowering the vulcanization rate, despite the blending of organic sulfur compounds. The rubber composition can be molded under substantially the same conditions as conventional compositions. This ensures that molded parts having an adequate hardness and a satisfactory initial velocity capability are produced without lowering productivity.

It has been confirmed that golf balls having center cores formed of the above rubber composition and one-piece golf balls formed of the above rubber composition are satisfactory golf balls constructed to provide an adequate hardness and high rebound.

In a first aspect, the invention provides a rubber composition for golf balls, comprising (A) a base rubber, (B) a metal salt of an unsaturated carboxylic acid and/or a mixture of an unsaturated carboxylic acid and zinc oxide, (C) an organic peroxide, and (D) 0.1 to 5 parts by weight per 100 parts by weight of the base rubber (A) of a mercaptan having the general formula: R-SH wherein R is a monovalent hydrocarbon group of 3 to 25 carbon atoms, excluding aromatic groups.

In a second aspect, the invention provides a rubber composition for golf balls, comprising the same components (A), (B) and (C) as in the first aspect, and (E) 0.1 to 4 parts by weight per 100 parts by weight of the base rubber (A) of a dialkyl disulfide having the general formula: $R^1$-S-S-$R^2$ wherein $R^1$ and $R^2$ are independently selected from alkyl groups represented by $C_nH_{2n+1}$ wherein n is an integer of 3 to 10.

The invention further provides a golf ball comprising a center core formed of the rubber composition defined above and a cover; and a one-piece golf ball formed of the rubber composition defined above.

DESCRIPTION OF THE PREFERRED EMBODIMENT

According to the invention, the rubber composition for golf balls is defined as comprising (A) a base rubber, (B) a metal salt of an unsaturated carboxylic acid and/or a mixture of an unsaturated carboxylic acid and zinc oxide, (C) an organic peroxide, and (D) a specific mercaptan and/or (E) a specific dialkyl disulfide. The composition is used as any of one-piece golf ball material, solid core material and solid center material.

The base rubber (A) used herein is often polybutadiene which is commonly used as a typical golf ball-forming rubber base. It is preferable to use 1,4-cis-polybutadiene, and especially 1,4-cis-polybutadiene having at least 40% of cis configuration. In the base rubber, natural rubber, polyisoprene rubber or styrene-butadiene rubber may be compounded along with the polybutadiene if desired.

In the golf ball-forming rubber composition of the invention, a metal salt of an unsaturated carboxylic acid and/or a mixture of an unsaturated carboxylic acid and zinc oxide is compounded as an essential component (B). The type of component (B) is selected in accordance with a particular part which is molded from the inventive rubber composition. When the golf ball-forming composition is used as a solid center material or solid core material, a metal salt of an unsaturated carboxylic acid is compounded as the essential component (B). When the golf ball-forming composition is used as a one-piece golf ball material, a mixture of an unsaturated carboxylic acid and zinc oxide is compounded as the essential component (B).

Illustrative preferred examples of the metal salt of unsaturated carboxylic acid are zinc dimethacrylate and zinc diacrylate. Zinc diacrylate is advantageously used for providing high resilience. An appropriate amount of the metal salt of unsaturated carboxylic acid blended is at least 5 part, especially at least 15 parts by weight and up to 45 parts, especially up to 30 parts by weight per 100 parts by weight of the base rubber.

Illustrative preferred examples of the unsaturated carboxylic acid are methacrylic acid and acrylic acid. Methacrylic acid is advantageously used for providing high durability. An appropriate amount of the unsaturated carboxylic acid blended is at least 5 part, especially at least 15 parts by weight and up to 45 parts, especially up to 30 parts by weight per 100 parts by weight of the base rubber.

When the unsaturated carboxylic acid is blended, zinc oxide must be blended together. An appropriate amount of the zinc oxide blended is at least 5 part, especially at least 15 parts by weight and up to 45 parts, especially up to 30 parts by weight per 100 parts by weight of the base rubber.

In the solid core material, solid center material and one-piece golf ball material, a suitable assistant is optionally blended in addition to the above essential component. For the solid core material and solid center material, an unsaturated carboxylic acid and zinc oxide can be additionally blended. For the one-piece golf ball material, a metal salt of unsaturated carboxylic acid can be additionally blended. Examples of the unsaturated carboxylic acid and the metal salt of unsaturated carboxylic acid that are used as the assistant are the same as above. The amount of such an assistant is determined as appropriate insofar as it does not adversely affect the essential component.

Examples of the organic peroxide (D) which is used in the rubber composition include 1,1-bis-t-butylperoxy-3,3,5-trimethylcyclohexane, dicumyl peroxide, di(t-butylperoxy)-m-diisopropylbenzene, and 2,5-dimethyl-2,5-di-t-butylperoxyhexane. An appropriate amount of the organic peroxide blended is at least 0.2 part, especially at least 0.5 part by weight and up to 5 parts, especially up to 2 parts by weight per 100 parts by weight of the base rubber. The organic peroxide may be used alone or in admixture of two or more.

In the first embodiment, the golf ball-forming rubber composition includes a mercaptan of the general formula: R-SH as an essential component (D). Herein R stands for monovalent hydrocarbon groups of 3 to 25 carbon atoms, especially 7 to 20 carbon atoms, excluding aromatic groups. Illustratively, R stands for straight or branched alkyl and alkenyl groups.

Illustrative, non-limiting, examples of the mercaptan (D) used herein include amyl mercaptan, heptyl mercaptan, octyl mercaptan, nonyl mercaptan, dodecyl mercaptan, stearyl mercaptan, and octadecane mercaptan. Use of t-nonyl mercaptan and stearyl mercaptan is especially preferred.

The amount of the mercaptan blended is at least 0.1 part, especially at least 0.3 part by weight and up to 5 parts, especially up to 2 parts by weight per 100 parts by weight of the base rubber (A). The use of the mercaptan in such an amount, combined with the foregoing essential components, is effective not only for restraining any drop of vulcanization rate and any drop of the hardness of a molded part itself, but also for imparting a good initial velocity capability and resilience to the molded part. Too smaller amounts fail to improve the initial velocity capability of the molded part. Too larger amounts invite a slow vulcanization rate and reduced productivity and result in a molded part with substantially reduced hardness and resilience.

In the second embodiment, the golf ball-forming rubber composition includes a dialkyl disulfide of the general formula:

$R^1$-S-S-$R^2$ as an essential component (F). Herein $R^1$ and $R^2$, which may be the same or different, are independently selected from alkyl groups represented by $C_nH_{2n+1}$ wherein n is an integer of 3 to 10, and preferably 4 to 8. Exemplary alkyl groups are straight or branched propyl, butyl, amyl (pentyl), hexyl, heptyl, octyl, nonyl, and decyl groups, with the butyl, amyl (pentyl), hexyl, heptyl and octyl being preferred. Two such alkyl groups are present per molecule while they are the same or different.

Illustrative, non-limiting, examples of the dialkyl disulfide include di-n-butyl disulfide, di-t-butyl disulfide, di-t-amyl disulfide, and di-t-heptyl disulfide. Use of di-t-butyl disulfide and di-t-heptyl disulfide is especially preferred.

The amount of the dialkyl disulfide blended herein is at least 0.1 part, especially at least 0.5 part and up to 4 parts, especially up to 2 parts by weight per 100 parts by weight of the base rubber (A). The use of the dialkyl disulfide in such an amount, combined with the foregoing essential components, is effective not only for restraining any drop of vulcanization rate and any drop of the hardness of a molded part itself, but also for imparting a good initial velocity capability and resilience to the molded part. Too smaller amounts fail to improve the initial velocity capability of the molded part. Too larger amounts invite a slow vulcanization rate and reduced productivity and result in a molded part with substantially reduced hardness and resilience.

The rubber composition according to the invention has compounded therein (A) the base rubber, (B) the metal salt of an unsaturated carboxylic acid and/or the mixture of an unsaturated carboxylic acid and zinc oxide, (C) the organic peroxide, and (D) the specific mercaptan and/or (E) the specific dialkyl disulfide although various additives can be blended if desired. A typical additive is a filler. For example, barium sulfate or calcium carbonate is blended for specific gravity adjustment. An appropriate amount of the filler blended is about 5 to 50 parts by weight per 100 parts by weight of the base rubber.

The golf ball-forming rubber composition is obtained by mixing the above-mentioned components in a conventional manner. For example, the components are mixed in a Banbury mixer or kneader.

When the rubber composition is processed into parts, pressure molding can be used as in the manufacture of well-known center cores and one-piece golf balls. More particularly, a slug of the mixed composition is placed in a selected mold where pressure molding is effected by vulcanizing at a temperature above 140° C., especially above 150° C., and below 180° C., especially below 165° C. for a time of at least about 10 minutes, especially at least about 15 minutes and within about 60 minutes, especially within about 30 minutes. For the molding of the inventive rubber composition, a vulcanizing time similar to that for prior art rubber compositions is employable. Accordingly, a molded part having an adequate hardness and high resilience can be formed by vulcanization or pressure molding without a decline of productivity.

Next, the golf ball of the invention is described. The type of the golf ball is not critical as long as it is at least partially formed of the inventive rubber composition. Embodiments of the invention encompass a one-piece golf ball formed solely of the inventive rubber composition, two-piece, three-piece and multi-piece golf balls in which the solid core formed of the inventive rubber composition is enclosed with a cover, and a wound golf ball having a solid center formed of the inventive rubber composition.

Where the golf ball is a two-piece golf ball comprising a solid core and a cover of single layer, the solid core is formed of the inventive rubber composition in which component (B) is a metal salt of unsaturated carboxylic acid. The solid core can be formed from the inventive rubber composition using a pressure molding process.

In this embodiment, the solid core usually has a diameter of at least 30 mm, especially at least 35 mm and up to 41 mm, especially up to 39 mm. Its weight is usually at least 20 g, especially at least 30 g and up to 40 g, especially up to 37 g.

The solid core formed of the inventive rubber composition has a very high level of resilience, a relatively low hardness (compared with solid cores formed of conventional golf ball-forming rubber compositions), and a high initial velocity capability. The hardness of the solid core, as expressed by a deflection (mm) under an applied load of 100 kg, is usually at least 2.0 mm, especially at least 2.5 mm and up to 5.0 mm, especially up to 4.0 mm, though not limited thereto. A smaller deflection may lead to an unpleasant feel whereas a larger deflection may compromise resilience.

The solid golf ball of this embodiment has the solid core enclosed with a cover. The cover may be formed of any well-known cover material. Exemplary cover materials are ionomer resins, balata rubber, and polyurethane, polyamide and polyester thermoplastic elastomers.

In forming the cover around the solid core, any well-known cover forming method may be used, for example, injection molding or compression molding. In the case of injection molding, for example, a preformed solid core is placed in a mold before a cover material is customarily injected therein. In the case of compression molding, a pair of half cups are formed from a cover material, a preformed solid core is encased in the half cups, and the assembly is pressurized in a mold.

The cover usually has a gage or radial thickness of at least 0.5 mm, preferably at least 1.0 mm and up to 4 mm, preferably up to 2.5 mm. A too thin cover may be less durable whereas a too thick cover may detract from resilience.

In the embodiment directed to solid golf balls, the golf ball may be embodied as a three-piece or multi-piece golf ball in which the core and/or the cover is composed of two or more layers, in addition to the above-described two-piece golf ball. Golf balls of such multilayer structure can also be manufactured by well-known methods using the above-described core materials and cover materials.

In another embodiment wherein the golf ball of the invention is a wound golf ball having a solid center, the solid center is formed of the inventive rubber composition in which component (B) is a metal salt of unsaturated carboxylic acid, like the above-mentioned solid core.

In this embodiment, the solid center usually has a diameter of at least 25 mm, especially at least 28 mm and up to 38 mm, especially up to 33 mm. Its weight is usually at least 15 g, especially at least 20 g and up to 30 g, especially up to 25 g. Outside the range, a lighter solid center may lead to a decline of travel distance whereas a heavier solid center can cause the ball to exceed the limit prescribed in the Rules of Golf.

The hardness of the solid center, as expressed by a deflection (mm) under an applied load of 100 kg, is usually at least 1 mm, especially at least 1.5 mm and up to 10 mm, especially up to 6 mm, though not limited thereto. A smaller deflection may lead to an unpleasant feel whereas a larger deflection may cause a lowering of productivity.

In forming a wound core from the solid center, any well-known method may be used, for example, by winding a rubber thread of polyisoprene around the solid center in a random winding pattern. A cover can be formed around the wound core using a similar material and method as used in the formation of the cover on the solid golf ball.

In a further embodiment wherein the golf ball is a one-piece golf ball, the inventive rubber composition in which component (B) is a mixture of an unsaturated carboxylic acid and zinc oxide is prepared, and molded in a suitable one-piece golf ball mold by a pressure molding process under conditions well-known for the pressure molding of rubber compositions of this type.

In all the embodiments, the golf balls of the invention have a diameter and a weight according to the Rules of Golf, typically a diameter of 42.67 mm to 42.75 mm and a weight of 45.2 g to 45.93 g.

There has been described a golf ball-forming rubber composition which lends itself to pressure molding and is capable of forming molded parts having an adequate level of hardness and resilience, without lowering the vulcanization rate, at a high productivity. A golf ball produced using the rubber composition is endowed with an adequate hardness and high rebound.

EXAMPLE

Examples of the invention are given below by way of illustration and not by way of limitation.

Examples 1–5 & Comparative Examples 1–4

Rubber materials of the formulation shown in Table 1 were mixed in a kneader and formed into slugs. The slugs were placed in a mold where pressure molding was conducted at 155° C., obtaining solid cores having a diameter of 38.7 mm.

The solid cores were examined by the following tests, with the results shown in Table 1.

Core hardness

A deflection (mm) of the solid core under an applied load of 100 kg was measured. A greater deflection indicates a softer core.

Core initial velocity

Measured by an initial velocity instrument of the same type as prescribed by the USGA.

Vulcanizing time

Using a JSR curelastometer, a torque was measured at 155° C. for 30 minutes. The vulcanizing time was a time taken until the torque value A was reached.

$$A=[(Tmax-Tmin)\times 0.9]+Tmin$$

Tmax: maximum torque, Tmin: minimum torque

TABLE 1

| Formulation (pbw) | Example | | | | | Comparative Example | | | |
|---|---|---|---|---|---|---|---|---|---|
| | 1 | 2 | 3 | 4 | 5 | 1 | 2 | 3 | 4 |
| BR | 100 | 100 | 100 | 100 | 100 | 100 | 100 | 100 | 100 |
| Zinc diacrylate | 25 | 25 | 25 | 25 | 25 | 25 | 23 | 25 | 25 |
| Zinc oxide | 23.3 | 23.3 | 23.3 | 23.3 | 23.3 | 23.3 | 24.8 | 23.3 | 23.3 |
| Dicumyl peroxide | 1 | 1 | 1 | 1 | 1 | 1 | 1 | 1 | 1 |
| t-nonyl mercaptan | 0.5 | 1 | 1.5 | | | | | | |
| Stearyl mercaptan | | | | 1 | 2 | | | | |
| Pentachlorothiophenol | | | | | | | | | 1 |

TABLE 1-continued

| Formulation | Example | | | | | Comparative Example | | | |
|---|---|---|---|---|---|---|---|---|---|
| (pbw) | 1 | 2 | 3 | 4 | 5 | 1 | 2 | 3 | 4 |
| Diphenyl disulfide | | | | | | | | | 1 |
| Vulcanizing time (min) | 14 | 15 | 17 | 15 | 15 | 13 | 13 | 21 | 20 |
| Core hardness (mm) | 2.94 | 3.0 | 3.25 | 2.9 | 2.91 | 2.86 | 3.2 | 4.05 | 3.98 |
| Core initial velocity (m/s) | 77.19 | 77.28 | 77.06 | 77.08 | 77.08 | 77.0 | 76.7 | 77.02 | 76.66 |

BR: 1,4-cis-polybutadiene BR01 by JSR
t-nonyl mercaptan: (n-$C_9H_{19}$)—SH by Wako Junyaku K.K.
Stearyl mercaptan: $C_{17}H_{35}$—SH by Yodo Chemicals K.K.

As is evident from Table 1, the solid cores formed of golf ball-forming rubber compositions within the scope of the invention can be molded within an appropriate vulcanizing time to comply with pressure molding and have an adequate hardness and excellent initial velocity capability.

By contrast, the solid cores of Comparative Examples 1 and 2 are inferior in initial velocity capability to the solid cores of Examples.

In particular, a comparison is made between Examples and Comparative Example 1. They are of the same composition except that Comparative Example 1 lacks the mercaptan, and the hardness (deflection) of the cores of Examples is slightly lower than that of Comparative Example 1. Nevertheless, the cores of Examples are superior in initial velocity capability to Comparative Example 1.

The cores of Comparative Examples 3 and 4, which contained a small amount of aromatic sulfur compound, exhibited a slow initial velocity and a too low hardness. Although Examples and Comparative Examples 3 and 4 are of the same composition except that the type of organic sulfur compound differs, a comparison of their vulcanizing time reveals that Comparative Examples 3 and 4 takes a longer time.

Example 6 & Comparative Example 5

Rubber materials of the formulation shown in Table 2 were mixed in a kneader and formed into slugs. The slugs were placed in a mold where pressure molding was conducted at 165° C., obtaining one-piece golf balls having a diameter of 42.7 mm.

The one-piece golf balls were examined for hardness and initial velocity by the same test as above. The vulcanizing time was measured as follows. The results are shown in Table 2.

Vulcanizing time

Using a JSR curelastometer, a torque was measured at 165° C. for 45 minutes. The vulcanizing time was a time taken until the torque value A was reached.

$$A=[(Tmax-Tmin)\times 0.9]+Tmin$$

Tmax: maximum torque, Tmin: minimum torque

TABLE 2

| Formulation (pbw) | Example 6 | Comparative Example 5 |
|---|---|---|
| BR | 100 | 100 |
| Methacrylic acid | 23 | 23 |
| Zinc oxide | 22 | 22 |
| Dicumyl peroxide | 1 | 1 |
| t-nonyl mercaptan | 1 | 0 |
| Vulcanizing time (min) | 29 | 27 |
| Ball hardness (mm) | 2.82 | 2.71 |
| Ball initial velocity (m/s) | 74.17 | 73.72 |

BR: 1,4-cis-polybutadiene BR01 by JSR
t-nonyl mercaptan: (n-$C_9H_{19}$)—SH by Wako Junyaku K.K.

Examples 7–17 & Comparative Examples 6–9

Rubber materials of the formulation shown in Table 3 were mixed in a kneader and formed into slugs. The slugs were placed in a mold where pressure molding was conducted at 155° C., obtaining solid cores having a diameter of 39.2 mm.

The solid cores were examined by the same tests as in Example 1. The results are shown in Table 3.

TABLE 3

| Formulation | Example | | | | | | | | | | | Comparative Example | | | |
|---|---|---|---|---|---|---|---|---|---|---|---|---|---|---|---|
| (pbw) | 7 | 8 | 9 | 10 | 11 | 12 | 13 | 14 | 15 | 16 | 17 | 6 | 7 | 8 | 9 |
| BR | 100 | 100 | 100 | 100 | 100 | 100 | 100 | 100 | 100 | 100 | 100 | 100 | 100 | 100 | 100 |
| Zinc diacrylate | 25 | 25 | 25 | 25 | 25 | 25 | 25 | 25 | 25 | 25 | 25 | 25 | 23 | 25 | 25 |
| Zinc oxide | 20.6 | 20.6 | 20.6 | 20.6 | 20.6 | 20.6 | 20.6 | 20.6 | 20.6 | 20.6 | 20.6 | 20.6 | 21.6 | 23.3 | 23.3 |
| Dicumyl peroxide | 1 | 1 | 1 | 1 | 1 | 1 | 1 | 1 | 1 | 1 | 1 | 1 | 1 | 1 | 1 |
| Di-n-butyl disulfide | 0.5 | 1 | 1.5 | 2 | | | | | | | | | | | |
| Di-t-butyl | | | | | 0.5 | 1 | 2 | | | | | | | | |

TABLE 3-continued

| Formulation (pbw) | Example 7 | 8 | 9 | 10 | 11 | 12 | 13 | 14 | 15 | 16 | 17 | Comparative Example 6 | 7 | 8 | 9 |
|---|---|---|---|---|---|---|---|---|---|---|---|---|---|---|---|
| disulfide | | | | | | | | | | | | | | | |
| Di-t-amyl disulfide | | | | | | | | 0.5 | 1 | | | | | | |
| Di-t-heptyl disulfide | | | | | | | | | | 0.5 | 1 | | | | |
| Pentachlorothiophenol | | | | | | | | | | | | | | 1 | |
| Diphenyl disulfide | | | | | | | | | | | | | | | 1 |
| Vulcanizing time (min) | 13 | 13.5 | 14 | 14 | 13 | 14 | 14 | 14 | 15 | 13 | 13 | 13 | 13 | 21 | 20 |
| Core hardness (mm) | 3.09 | 3.15 | 3.29 | 3.35 | 3.15 | 3.17 | 3.3 | 3.28 | 3.31 | 3.08 | 3.36 | 3.06 | 3.38 | 4.05 | 3.98 |
| Core initial velocity (m/s) | 76.84 | 76.81 | 76.75 | 76.73 | 76.8 | 76.97 | 76.75 | 76.71 | 76.72 | 77.04 | 76.86 | 76.69 | 76.5 | 77.02 | 76.66 |

BR: 1,4-cis-polybutadiene BR01 by JSR
Di-n-butyl disulfide: $(n-C_4H_9)_2-S_2$ Wako Junyaku K.K.
Di-t-butyl disulfide: $(t-C_4H_9)_2-S_2$ Wako Junyaku K.K.
Di-t-amyl disulfide: $(t-C_5H_{11})_2-S_2$ Wako Junyaku K.K.
Di-t-heptyl disulfide: $(t-C_7H_{15})_2-S_2$ Wako Junyaku K.K.

As is evident from Table 3, the solid cores formed of golf ball-forming rubber compositions within the scope of the invention can be molded within an appropriate vulcanizing time to comply with pressure molding and have an adequate hardness and excellent initial velocity capability.

By contrast, the solid cores of Comparative Examples 6 and 7 are inferior in initial velocity capability to the 25 solid cores of Examples.

In particular, a comparison is made between Examples and Comparative Example 6. They are of the same composition except that Comparative Example 6 lacks the dialkyl disulfide, and the cores of Examples is slightly softer than Comparative Example 6. Nevertheless, the cores of Examples are superior in initial velocity capability to Comparative Example 6.

The cores of Comparative Examples 8 and 9, which contained a small amount of aromatic sulfur compound, required a longer vulcanizing time and were unsuitable for pressure molding, and exhibited a too low hardness.

Example 18 & Comparative Example 10

Rubber materials of the formulation shown in Table 4 were mixed in a kneader and formed into slugs. The slugs were placed in a mold where pressure molding was conducted at 165° C., obtaining one-piece golf balls having a diameter of 42.7 mm.

The one-piece golf balls were examined for hardness and initial velocity by the same test as in Example 1. The vulcanizing time was measured as in Example 6. The results are shown in Table 4.

TABLE 4

| Formulation (pbw) | Example 18 | Comparative Example 10 |
|---|---|---|
| BR | 100 | 100 |
| Methacrylic acid | 23 | 23 |
| Zinc oxide | 22 | 22 |
| Dicumyl peroxide | 1 | 1 |
| Di-t-butyl disulfide | 1 | 0 |
| Vulcanizing time (min) | 29 | 27 |
| Ball hardness (mm) | 2.80 | 2.71 |
| Ball initial velocity (m/s) | 74.19 | 73.72 |

BR: 1,4-cis-polybutadiene BR01 by JSR
Di-t-butyl disulfide: $(t-C_4H_9)_2-S_2$ by Wako Junyaku K.K.

Japanese Patent Application Nos. 2000-097297, 2000-097158 and 2000-265563 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A rubber composition for golf balls, comprising
   (A) a base rubber,
   (B) a metal salt of an unsaturated carboxylic acid and/or, a mixture of an unsaturated carboxylic acid and zinc oxide,
   (C) an organic peroxide, and
   (D) 0.1 to 5 parts by weight per 100 parts by weight of the base rubber (A) of a mercaptan selected from the group consisting of amyl mercaptan, heptyl mercaptan, octyl mercaptan, nonyl mercaptan, stearyl mercaptan and octadecane mercaptan.

2. A golf ball comprising a center core and a cover of at least one layer, said center core being formed of the rubber composition of claim 1.

3. The golf ball of claim 2 wherein the cover includes at least two layers.

4. A one-piece golf ball formed of the rubber composition of claim 1.

5. A rubber composition for golf balls, comprising
   (A) a base rubber,
   (B) a metal salt of an unsaturated carboxylic acid and/or, a mixture of an unsaturated carboxylic acid and zinc oxide, (C) an organic peroxide, and (E) 0.1 to 4 parts by weight per 100 parts by weight of the base rubber (A) of a dialkyl disulfide having the general formula: $R^1\text{-}S\text{-}S\text{-}R^2$ wherein $R^1$ and $R^2$ are independently selected from alkyl groups represented by $C_nH_{2n+1}$ wherein n is an integer of 3 to 10.

6. A golf ball comprising a center core and a cover of at least one layer, said center core being formed of the rubber composition of claim 5.

7. The golf ball of claim 6 wherein the cover includes at least two layers.

8. A one-piece golf ball formed of the rubber composition of claim 5.

9. The composition of claim 1 wherein the mercaptan is selected from the group consisting of nonyl mercaptan and stearyl mercaptan.

10. The composition of claim 9 wherein the mercaptan is nonyl mercaptan.

11. The composition of claim 10 wherein the nonyl mercaptan is t-nonyl mercaptan.

12. The composition of claim 1 wherein the amount of the mercaptan blended is 0.3 to 2 parts by weight.

* * * * *